UNITED STATES PATENT OFFICE.

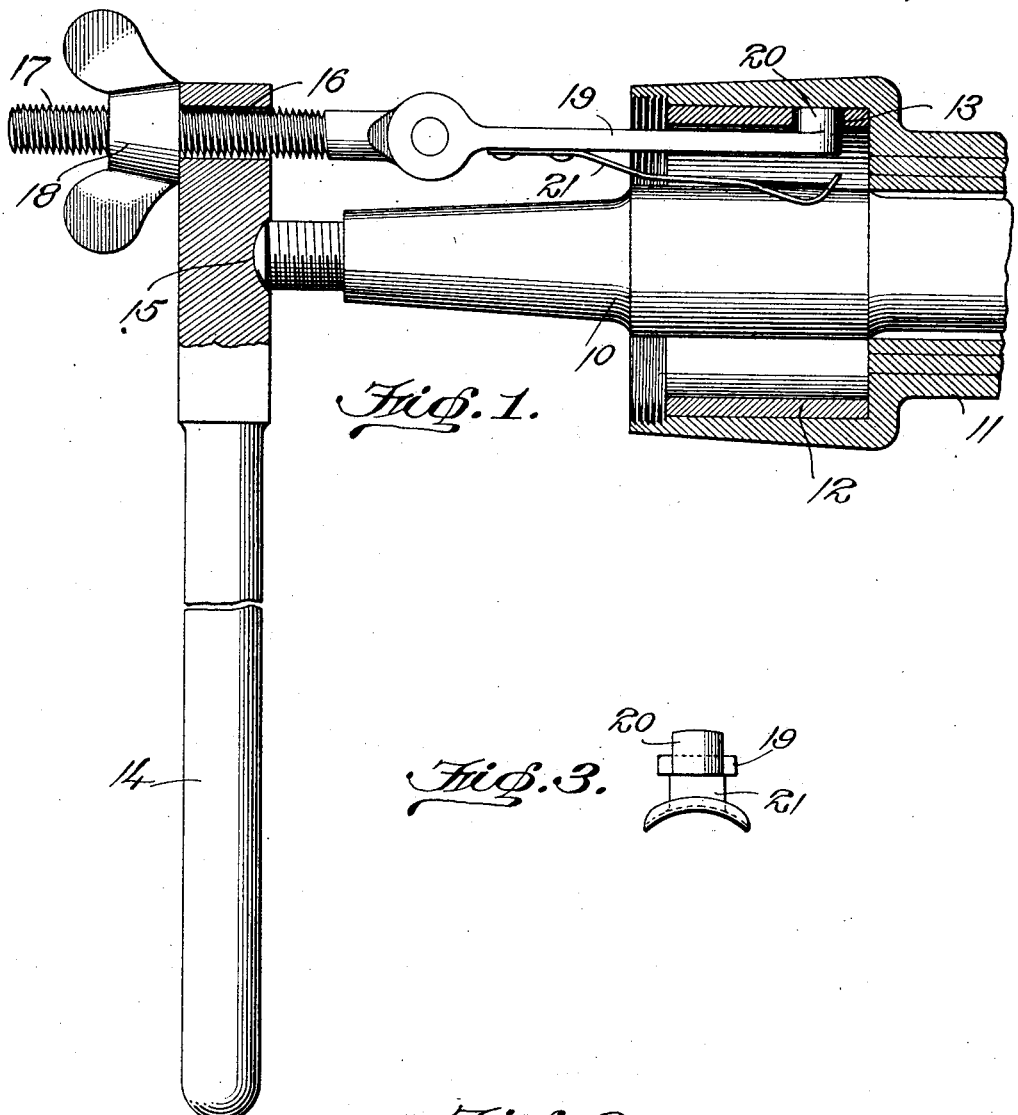
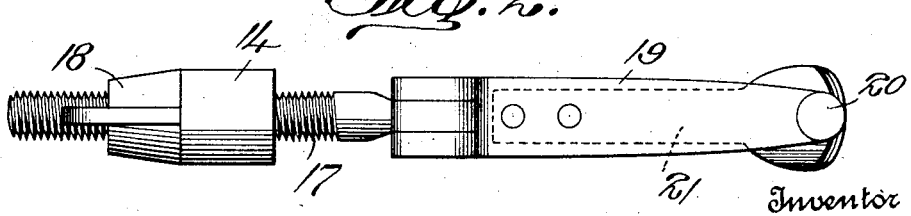

JACOB KRAY, OF ELGIN, ILLINOIS.

ROLLER-BEARING-SLEEVE PULLER.

1,395,502.  Specification of Letters Patent.  Patented Nov. 1, 1921.

Application filed June 25, 1920. Serial No. 391,621.

*To all whom it may concern:*

Be it known that I, JACOB KRAY, a citizen of the United States, and resident of Elgin, in the county of Kane and State of Illinois, have invented certain new and useful Improvements in Roller-Bearing-Sleeve Pullers, of which the following is a specification.

My invention relates to roller bearing sleeve pullers and particularly to a device of this character adapted to effect the removal of roller bearing sleeves mounted in the housings surrounding the rear axles of motor vehicles.

It is my purpose to provide a tool of this character which will be simple in construction, efficient in use, easily adjusted to adapt the same to varying conditions, and which will utilize the end of the axle as a support during operation to thus obtain substantially a direct extracting pull on the sleeve.

Furthermore, it is my purpose to provide a tool of this character embodying an improved construction for maintaining operative engagement between the tool and sleeve during the pulling operation.

With the above and other purposes in view my invention consists in the details of construction and in the arrangement and combination of parts to be hereinafter more fully set forth and particularly pointed out in the appended claims.

In describing my invention in detail reference will be had to the accompanying drawing wherein like characters of reference denote corresponding parts in the several views, and in which—

Figure 1 is a longitudinal section of a fragment of an axle housing and axle, and a side elevation partly in section of my improved sleeve extractor showing the manner of applying the latter to effect extraction;

Fig. 2, a top plan view of the extractor; and

Fig. 3, an end of the sleeve engaging member and its seating spring.

Referring to the drawings 10 indicates a motor vehicle axle and 11 the usual housing surrounding the same. Tightly fitted within the housing 11 is the roller bearing sleeve 12 of well known construction and provided with the usual aperture 13 for the reception of an element of an extracting tool.

My improved tool is shown as comprising a handle 14 provided on one side with a socket 15 adapted to receive an axle end when the tool is operatively applied as clearly shown in Fig. 1. Between the socket 15 and the end of the handle nearest thereto said handle is provided with an aperture 16 in which is loosely engaged a screw 17 having threaded thereon a winged nut 18 coacting with the side of the handle opposite the socket 15 to effect adjustment of the screw as will be apparent. Pivotally connected to the end of the screw 17 on the same side of the handle 14 as the socket 15 is an extracting member 19 the free end of which is provided with a laterally directed nib 20 adapted to engage in the aperture 13 of the sleeve 12 during the operation of extracting said sleeve. Secured to the side of the extracting member 19 opposite the nib 20 is one end of a leaf spring 21. This spring is normally directed away from the member 19 and its free end is shaped to snugly fit the axle 10 by being enlarged laterally and curved transversely to conform with the curvature of the axle 10. In addition the free end of the spring 21 is normally disposed at such a distance from the member 19 that when the tool is inserted between the axle 10 and sleeve 12 said spring will be energized and react against the member 19 to positively hold the nib 20 in the aperture 13 during the operation of extracting the sleeve 12, thus rendering the action of the tool certain and positive once it is operatively applied.

Assuming that the tool is operatively applied as shown in Fig. 1 it will be apparent that if the required force is applied to the handle at the point and in the direction indicated by the arrow in Fig. 1 then the desired extraction of the sleeve 12 will be effected. It will also be apparent that by manipulating the nut 18 the extracting member 19 can be adjusted relatively to the handle as will be obvious.

I claim—

1. A roller bearing sleeve extractor comprising a handle having a socket and a passage therethrough extending in the same direction as the socket, a screw loosely engaged in said passage, a nut on the screw coacting with the handle to adjust the screw relatively to said handle, and an extracting member pivoted to the end of the screw on the same side of the handle as the socket.

2. A roller bearing sleeve extractor comprising a handle having a socket and a passage therethrough extending in the same direction as the socket, a screw loosely engaged in said passage, a nut on the screw coacting with the handle to adjust the screw relatively to said handle, an extracting member pivoted to the end of the screw on the same side of the handle as the socket, and a spring secured to the extracting member and adapted to react from a fixed part to hold the extracting member in operative relation to a sleeve to be extracted.

3. A roller bearing sleeve extractor comprising a handle having a socket, a pivotally mounted extracting element adjustably connected to the handle and disposed on the same side thereof as the socket, and a spring secured to the extracting element and adapted to react from a fixed part to hold the extracting element in operative relation to a sleeve to be extracted.

In testimony whereof I hereunto affix my signature in the presence of two witnesses.

JACOB KRAY.

Witnesses:
FRANK A. MCCARTHY,
J. V. MCCARTHY.